United States Patent [19]
Coughlin

[11] 3,851,665
[45] Dec. 3, 1974

[54] TESTABLE PLUG SHUT-OFF AND DOUBLE CHECK VALVE

[76] Inventor: Donald W. Coughlin, P.O. Box 535, Lake Arrowhead, Calif. 92352

[22] Filed: Aug. 9, 1973

[21] Appl. No.: 386,987

[52] U.S. Cl............. 137/614.17, 137/301, 137/385
[51] Int. Cl........................................... F16k 43/00
[58] Field of Search....... 137/614.2, 614.19, 614.18, 137/614.17, 614.16, 301, 302, 385; 151/8, 614.21, 613, 512; 251/309-312

[56] References Cited
UNITED STATES PATENTS

| 305,843 | 9/1884 | Pierson | 151/8 X |
| 558,708 | 4/1896 | Baldwin | 137/301 |
| 1,125,675 | 1/1915 | Elder et al. | 137/385 X |
| 2,500,156 | 3/1950 | Dechant | 137/614.2 X |

*Primary Examiner*—Charles J. Myhre
*Assistant Examiner*—Ira S. Lazarus

[57] ABSTRACT

A body having a bore with offset lateral inlet and outlet connections, a hollow plug divided internally by tandem valve seats into lower, middle and upper chambers, a pair of tandem check valves co-axially mounted in said plug to be lightly spring biased downwardly respectively into closed relation with said valve seats, primary and secondary passageways in said plug communicating respectively (with said plug in open position) between said upper chamber and said outlet connection and between said lower chamber and said inlet connection, imperforate areas on said plug being disposed opposite said inlet and outlet connections, when said plug is in closed position, thereby halting a flow of liquid from said inlet connection to said outlet connection. Drain petcocks are provided in the valve body, opening respectively into the inlet and outlet connections to drain water from either the house or service main side of the valve. When the plug is in closed position, three outlets are set up respectively from said three chambers to petcocks for periodic testing of each check valve or to drain each chamber for frost protection. When the plug is in closed position it allows for disassembly of the moving parts of the check valves for repair by simply relocating two lock screws to unlock the wrench key head of the plug allowing it to be removed and to lock the plug in closed position while work on the valves is taking place.

7 Claims, 8 Drawing Figures

TESTABLE PLUG SHUT-OFF AND DOUBLE CHECK VALVE

SUMMARY OF THE INVENTION

It is a primary object of the present invention to provide a superior combination shut-off and check valve for use at the meter in providing a domestic water service connection under the code.

Another object is to provide such a valve including drain petcocks operable when the valve is closed, to drain the line on either side of the valve.

A further object is to provide such a plug shut-off valve embodying within the plug a check valve capable of being repaired, without draining either of said lines, while the plug is turned to closed position.

Yet another object is to provide such a combination valve wherein a tandem co-axial check valve is provided in said plug, thereby greatly decreasing the possibility of failure.

It is also an object of the invention to provide in such a valve, when the plug is in closed position, communication between the valve chambers thereof and drain petcock means for draining all said chambers for inspection, valve testing and frost protection.

DETAILED DESCRIPTION OF THE PREFERRED EMBODIMENT

Figure 1:
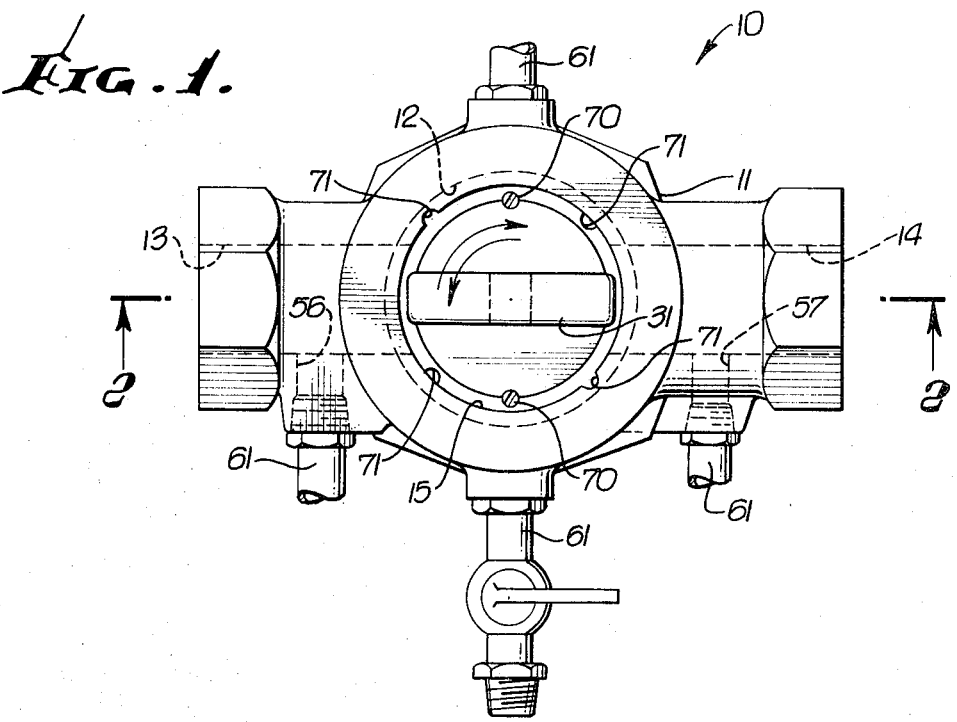
FIG. 1 is a diagrammatic plan view of a preferred embodiment of the invention, with the valve plug in open position.
Figure 2:
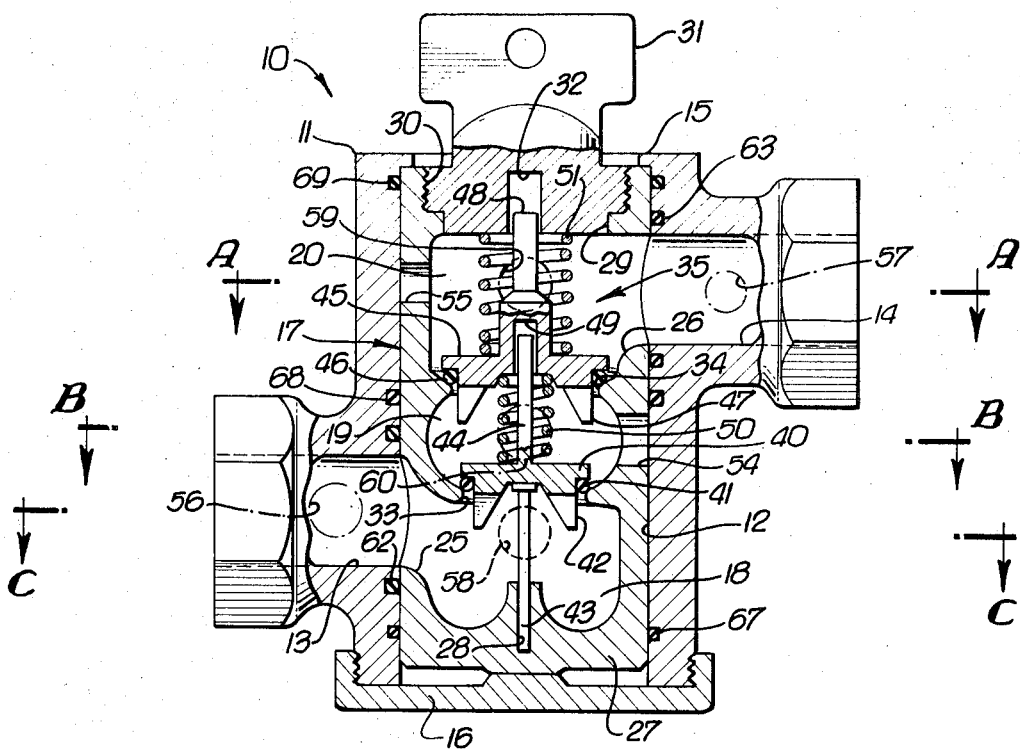
FIG. 2 is a vertical sectional view taken on line 2—2 of FIG. 1.
Figure 3:
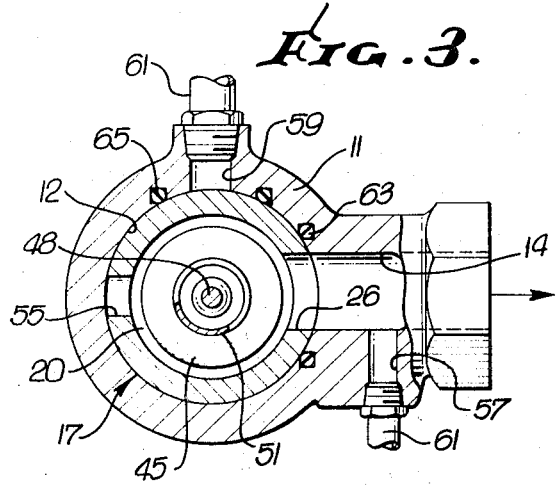
FIG. 3 is a horizontal sectional view, at a reduced scale, taken on line A—A of FIG. 2.

The drainable shut-off and check valve 10 of the invention has a valve body 11 which is preferably cast in tubular form to provide a bore 12 which may be cylindrical or slightly tapered, said body providing lateral off-set inlet and outlet connections 13 and 14.

The upper end of body 11 has an inturned annular lip 15 and the lower end thereof is externally threaded to receive a cap 16. Rotatably fitting the bore 12 and confined therein between the lip 15 and cap 16 is a valve plug 17 which is preferably cast to provide co-axial lower, middle and upper chambers 18, 19 and 20 respectively and a passage 25 which communicates between inlet connection 13 and lower chamber 18, and a passage 26 which communicates between the upper chamber 20 and the outlet connection 14 when the valve plug 17 is in open position. The bottom 27 of the valve plug 17 is preferably cast integral therewith and is provided axially with a blind hole 28, the purpose of which will be made clear later. At its upper end, the valve plug 17 is provided with a short bore 29 having an internally threaded counterbore 30 and the upper end of chamber 20 is closed by a wrench key head 31, the base of which is shaped to fit bore 29 and screw into counterbore 30. The key head 31 has an axial blind hole 32, the purpose of which shall be made clear later.

Dividing the middle chamber 19 from the lower chamber 18 and upper chamber 20 respectively are annular valve seats 33 and 34, the upper of these valve seats 34 being of substantially larger diameter than the lower valve seat 33.

Telescopically mountd in blind holes 28 and 32 is a check valve core assembly 35. All the elements of assembly 35 are co-axially related and include a lower check valve 40 having an O-ring 41 which rests downwardly on lower check valve seat 33, guide lugs 42 which extend downwardly through said seat, a downwardly extending stem 43 which slides telescopically in blind hole 28 and an upwardly extending stem 44. The assembly 35 also includes an upper check valve 45 having an O-ring 46 which rests downwardly on upper check valve seat 34, guide lugs 47 which extend downwardly through seat 34, and an upwardly extending stem 48. The valve 45 and stem 48 are provided with a blind hole 49 into which the upwardly extending stem 44 of the lower check valve 40 is telescopically received. The upper portion of stem 48 of upper check valve 45 is telescopically received in the blind hole 32 provided in the wrench key head 31. Surrounding the upwardly extending stems 44 and 48 are light coil springs 50 and 51 which respectively bias the lower check valve 40 and upper check valve 45 against check valve seats 33 and 34.

The valve plug 17 is provided with third and fourth passages 54 and 55, see FIGS. 2, 3, 4, 5 and 6, which are formed in the plug wall to communicate respectively with the middle and upper chambers 19 and 20 thereof. The valve body 11 is provided with tapped holes for receiving drain cocks for draining water from various portions of the valve 10 either to protect the same from frost damage or for inspection or valve testing purposes. These drain cock receiving ports include ports 56 and 57 which communicate respectively with inlet and outlet connections 13 and 14 of the valve, and are employed when the valve 10 is shut off for draining either the service line or main line which are connected by valve 10. Drain cock ports 58 and 59 are provided on one side of valve 10 in the valve body 11 to communicate respectively with passages 25 and 55, when the valve 10 is shut off, and can be used for draining lower and upper plug chambers 18 and 20 or for valve testing purposes. The valve body 11 is also provided on the opposite side of valve 10 with a drain cock port 60 which communicates with third plug passage 54, when the valve 10 is shut off, and can be used for draining water from the middle chamber 19 or for valve testing purposes.

For use in independently draining plug chambers 18, 19 and 20 or draining the water main or service line which valve 10 connects, or for periodically testing each of the check valves 40 and 45, each of the tapped holes 56, 57, 58, 59 and 60 is provided with a drain cock 61 (FIG. 1) which is commonly known as a "petcock."

Suitable recesses are provided in the bore 12 for receiving O-rings, as follows: and O-ring 62 encircling inlet 13, and O-ring 63 encircling outlet 14, an O-ring 64 encircling petcock port 58, an O-ring 65 encircling petcock port 59, and an O-ring 66 encircling petcock port 60. Lower, intermediate and upper O-ring 67, 68 and 69 are also provided in planes normal to the axis of bore 12 for sealing the space between said bore and valve plug 17.

The wrench key head 31 is keyed to the valve plug 17 by two screws 70 which are screwed into suitable tapped holes exending downwardly in overlapping relation with the key head 31 and the tapped counterbore 30 into which said head is screwed. Similar tapped holes 71 are formed vertically in plug 17 in overlapping relation with lip 15 of the body 11. The latter holes are formed while valve 10 is shut off so that when said valve is open as shown in FIG. 1, mating halves of the holes 71 are located 90° apart. The holes 71 are provided for use in disassembling wrench key head 31 from the valve plug 17 which always takes place when the valve 10 is in shut-off position and which brings the halves of the tapped holes 71 into registry. The disassembly is thus accomplished by removing the screws 70 one at a time from the holes in which these are shown as located in FIG. 1 and these screws are then inserted one at a time, as so removed, into the holes 71 so as to lock the valve plug 17 against rotation out of its shut-off position, before the wrench key head 31 is released for unscrewing the same from the valve plug 17 and thereby opening the upper chamber 20 of the valve plug to view. This permits the ready removal of the check valve core assembly 35 for repair or replacement. After the latter function has been performed, the wrench key head 31 is replaced and the screws 70 removed singly from the tapped holes 71 and replaced one at a time, as they are so removed, in the tapped holes provided therefor in the valve plug 17 and key head 31 whereby they resume their function of locking the wrench key head 31 in said plug.

OPERATION

The valve 10 of the invention is located between the main water supply line which screws into the inlet connection 13 and the domestic service line which screws into the outlet connection 14 and leads directly to the meter from which service is extended to the premises pertaining thereto. The relatively weak coil springs 50 and 51 maintain the lower and upper check valves 40 and 45 in sealing engagement with the valve seats 33 and 34 so as to give double assurance that these valves will effectively prevent a reverse flow of water through the valve 10 should there be a pressure drop in the main connecting with inlet connection 13.

The valve 10 has the further advantage of providing facilities for optionally draining either the main line connecting with inlet connection 13 or the service line connecting with outlet connection 14, when the valve 10 is shut off. The valve also offers facilities, when the same is shut off, to drain the interior of the valve plug 17 and particularly each of the three chambers 18, 19 and 20 provided therein so as to completely eradicate the danger of frost damage to the valve.

Figure 4:
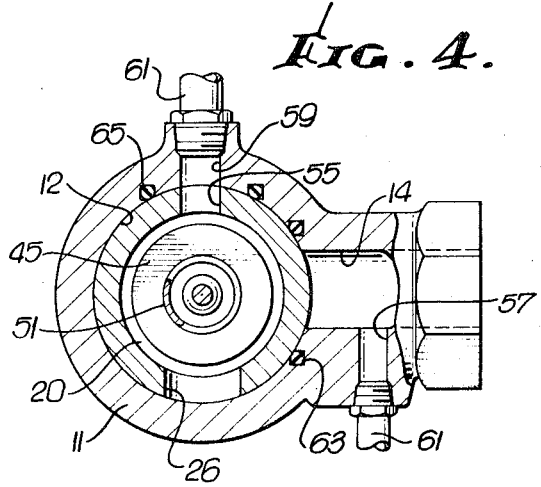
FIG. 4 is a view similar to FIG. 3 with the valve plug turned to closed position.
Figure 5:
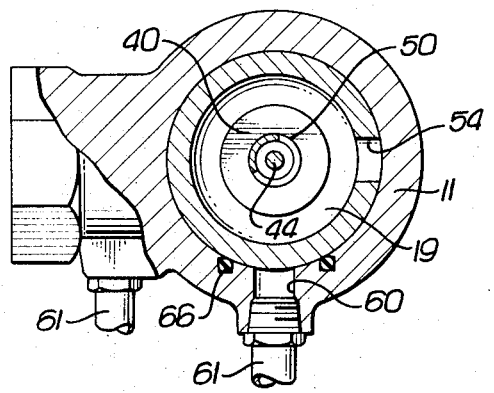
FIG. 5 is a horizontal sectional view, at a reduced scale, taken on line B—B of FIG. 2.
Figure 6:
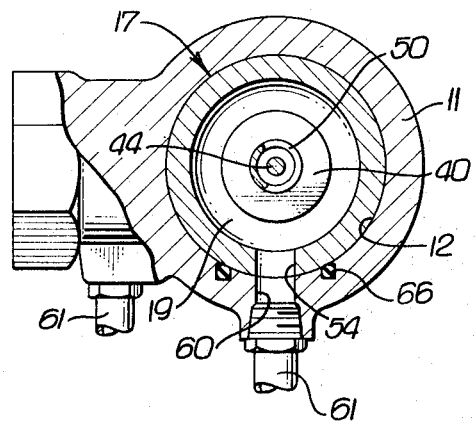
FIG. 6 is a view similar to FIG. 5 with the valve plug turned to closed position.
Figure 7:
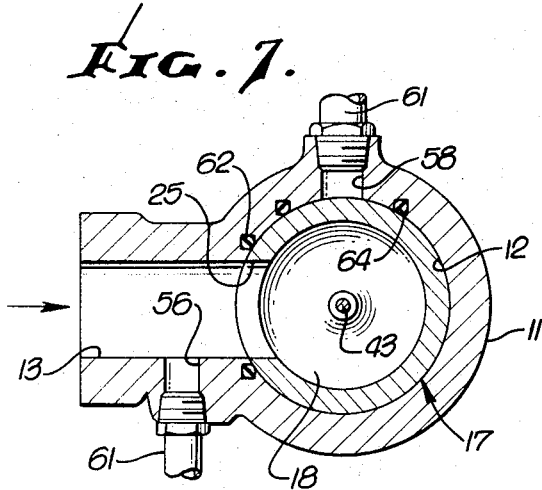
FIG. 7 is a horizontal sectional view, at a reduced scale, taken on line C—C of FIG. 2.
Figure 8:
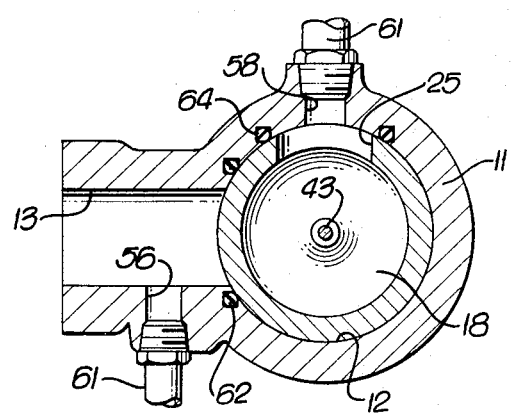
FIG. 8 is a view similar to FIG. 7 with the valve plug turned to closed position.

While valve 10 is open as shown in FIGS. 1, 2, 3, 5 and 7, the petcocks 61 are customarily kept closed. In fact, an occasion for opening one or more of the petcocks 61 does not exist excepting when the valve plug 17 is turned clockwise 90° from its "on" position to its "off" position shown in FIGS. 4, 6 and 8. When this takes place, imperforate peripheral areas on the plug 17 shift into closed relation with inlet and outlet valve connections 13 and 14. At the same time, lower plug chamber 18 is brought into communication with tapped port 58 through plug passage 25 (FIG. 8); middle chamber 19 is brought into communication with tapped port 60 through plug passage 54 (FIG. 6); and upper chamber 20 is brought into communication with tapped port 59 through plug passage 55 (FIG. 4).

With valve 10 thus shut off, water in chambers 18, 19 and 20 is trapped therein. As petcocks 61 are normally all closed, escape through one of these is thus prevented. Water in chamber 20 is also prevented from escaping downwardly into chamber 19 by check valve 45 being spring closed. Water in chamber 19 is prevented from escaping downwardly into chamber 18 by check valve 40 being spring closed. These circumstances facilitate a quick test being periodically made of the two check valves 45 and 40 as follows.

With the valve 10 shut off, middle chamber 19 is drained by opening its petcock 61 after which the petcock 61 of chamber 20 is opened and water under prssure is forced therethrough into chamber 20. If check valve 45 leaks, water will flow out of the petcock 61 of middle chamber 19. If check valve 45 proves not to be leaking, valve 40 is then tested by closing the petcock of chamber 20, opening the petcock 61 of lower chamber 18, until the latter chamber drains empty, after which water under pressure is injected into middle chamber 19 through its petcock 61. If check valve 40 is not leaking, no repairs are required, the open petcocks are closed, the valve 10 is reopened and the test service is concluded. If either check valve should have been found to be leaking, when tested, the service would include removing wrench key head 31 and removing and replacing the check valve core assembly 35.

A simultaneous quick test of check valves 40 and 45 as a unit may be effected, starting with the valve 10 closed and full of water and with all the petcocks closed, by opening the petcock 61 in drain port 58, thus draining plug chamber 18, opening the petcock 61 in drain port 59, and injecting water under pressure through said petcock into the upper plug chamber 20. If no water leaks through check valve 40 into lower chamber 18 and out through drain port 58, it is known that at least one of the two check valves 40 and 45 is holding tight.

The provision of tandem check valves with a ready means of quickly subjecting the same to periodical testing and replacement of defective parts provides practical assurance against a service failure of the valve 10.

Finally, the valve 10 is provided with means for readily servicing the same when said valve is shut off and assuring that the valve will remain in shut-off condition until the wrench key head 31 is completely reassembled with and keyed to the valve plug 17.

I claim:

1. A combination plug shut-off and check valve comprising:
   a valve body having a vertical bore and lengthwise offset inlet and outlet connections opening into upper and lower portions of said bore,
   said valve body also having two drain-and-valve-testing port means located respectively at the levels of said connections and on bore radii disposed approximately 90° from alignment with said connections;

a valve plug rotatably fitting within said bore and having an axial cavity closed at the top and bottom of the plug and having lower and upper chambers, said plug having open and closed positions separated by a quarter turn of said plug in said bore, the wall of said plug having passage means, which, with said plug in open position, provide communication between said lower chamber and said inlet connection and between said upper chamber and said outlet connection, said passage means, with said plug in closed position providing communication between said lower and upper chambers respectively and said two drain and valve testing port means in said valve body, said plug having imperforate peripheral areas which shut said inlet and outlet connections when said plug is in closed position; and check valve means mounted in said cavity and controlling liquid flow between said lower and upper cavity chambers and limiting said liquid flow to an upward direction.

2. A valve as recited in claim 1 wherein
the wall of said plug cavity provides first and second tandem check valve seats which divide said cavity into lower, middle and upper cavity chambers; and wherein
said check valve means comprises first and second check valve members resting downwardly respectively on said seats.

3. A valve as recited in claim 2 wherein
said valve body also has a third drain and valve testing port means at the level of said middle plug chamber and co-planar with said first recited two such port means; and wherein
said passage means in said wall of said plug cavity also includes a passage in said wall which provides communication between said middle cavity chamber and said third drain-and-valve-testing port means when said plug is turned to closed position.

4. A valve as recited in claim 3 wherein
each of said drain-and-valve-testing port means is provided with petcock means for manually closing or opening said individual port means for the purposes of draining the chambers of said valve or in testing the respective check valves thereof.

5. A valve as recited in claim 1 wherein
said plug bottom is integral with said plug, and wherein
the top of said plug has a short axial bore and an internally threaded counterbore;
a wrench key plug head fitting and screwed into said bore and counterbore;
there being a primary key way hole in the top of said valve plug which hole intercepts the edge of said plug head,
a similar secondary tapped key way hole being provided in the top of said valve plug which intercepts the edge of said valve body with said plug in closed position; and
screw key means which is optionally adapted to be screwed into said primary tapped key way hole to unite said wrench key head with said valve plug (for rotating said valve plug in said body bore) or, to be removed from said primary tapped key way hole after said valve plug has been rotated to its closed position and screwed into said secondary tapped key way hole to lock said valve plug in its closed position while freeing said plug head to be unscrewed from said valve plug;
said check valve means being readily removable for repair or replacement when said plug head is thus removed.

6. A valve as recited in claim 5 wherein
two of said primary tapped key way holes are provided in diametrically opposite positions in a plane normal to the wrench key of said key head, and wherein
two of said secondary tapped key way holes are provided while said plug is in closed position and with said holes in diametrically opposite positions, and wherein
two screw key means are provided and which normally occupy the two primary tapped key way holes to rigidly secure the wrench key plug head to the valve plug for turning the latter on or off and for closing the upper end of the plug cavity,
the duplication of key way holes and screw keys permitting turning the valve plug to closed position, removing one of said screw keys from one of said primary key way holes and inserting the same in one of said secondary key way holes thereby locking said valve plug to said valve body with said plug in closed position before removing the other screw key from the other primary key way hole to complete the unlocking of the plug head in said valve plug.

7. A combination plug shut-off and double check valve comprising:
a valve body having a vertical bore;
a hollow valve plug rotatable in said bore and having an axial cavity closed at the top and bottom of the plug and provided at spaced intervals therebetween with two co-axial valve seats, the diameter of the upper of which exceeds that of the lower;
upper and lower check valves resting downwardly upon said seats and providing a double restraint against return travel of fluid downwardly through said cavity, said seats and valves dividing said cavity into lower, middle and upper chambers;
said valve body having lateral inlet and outlet connections opening into said bore at the levels respectively of said lower and upper chambers of said plug,
said plug having open and closed positions at opposite ends of a quarter turn of said plug,
said plug also having primary and secondary lateral passages, which with said plug in open position, communicate respectively between said lower chamber and said inlet connection and between said upper chamber and said outlet connection, imperforate peripheral areas of said plug shutting said inlet and said outlet connections when said plug is turned to closed position;
drain-and-valve-testing means including a radial passage in the wall of each of said cavities and a radial port in said valve body which port is aligned with said radial passage when said plug is turned off, thereby giving access individually to said cavities for draining the latter or testing said valves; and
petcock means for individually controlling access from the outside to said radial ports.

* * * * *